United States Patent [19]

James

[11] Patent Number: 4,924,575
[45] Date of Patent: May 15, 1990

[54] PIZZA KNIFE WITH INTEGRAL HANDLE

[75] Inventor: Jeffrey P. James, Wichita, Kans.
[73] Assignee: ICT Manufacturing, Inc., Wichita, Kans.
[21] Appl. No.: 351,373
[22] Filed: May 15, 1989
[51] Int. Cl.⁵ ................................................ B26B 3/00
[52] U.S. Cl. ........................................ 30/315; 30/114
[58] Field of Search ................ 30/114, 308, 314–317, 30/356, 85

[56] References Cited

U.S. PATENT DOCUMENTS 1,414,098  4/1922  Santana ................................. 30/315

FOREIGN PATENT DOCUMENTS 468887  10/1950  Canada ................................... 30/316
96265   7/1939  Sweden .................................. 30/315

Primary Examiner—Douglas D. Watts
Attorney, Agent, or Firm—Kokjer, Kircher, Bradley, Wharton, Bowman & Johnson

[57] ABSTRACT

A pizza knife having a semi-elliptical cutting blade and an integral handle which includes opposite sides and a top arranged in a triangular shape. One side of the blade extends from the blade and the other side has a free edge spaced away from the blade to present a continuous gap leading to a channel provided in the handle. The sides converge as they extend away from the top and connect with the top at smoothly rounded corners to provide a comfortable and secure hand grip to facilitate handling of the pizza knife.

15 Claims, 1 Drawing Sheet

U.S. Patent
May 15, 1990
4,924,575
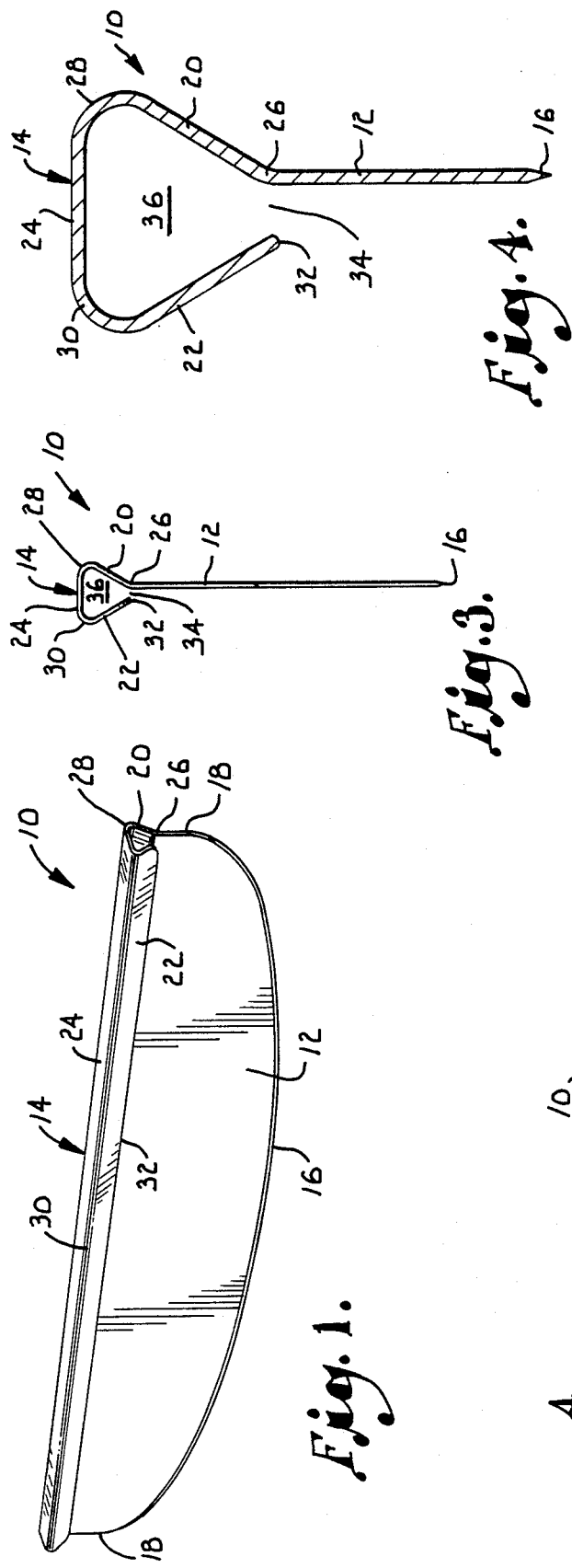
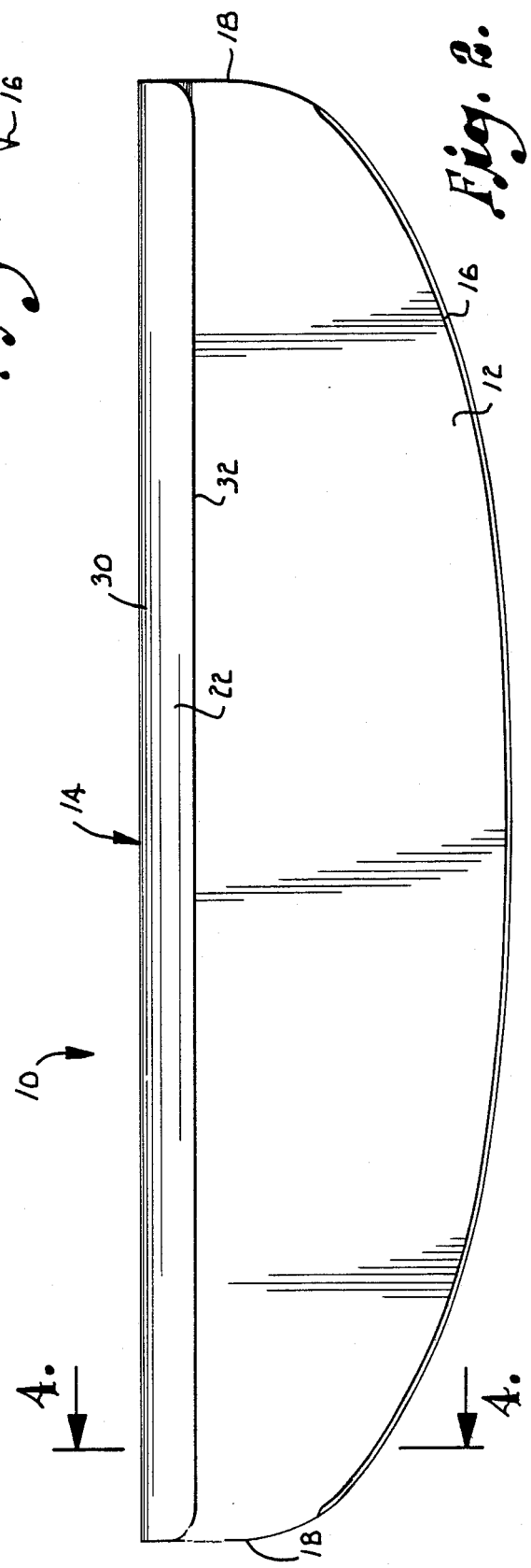

PIZZA KNIFE WITH INTEGRAL HANDLE

BACKGROUND AND SUMMARY OF THE INVENTION

This invention relates in general to pizza knives and deals more particularly with a pizza knife having a handle which is integral with the blade of the knife and which has a unique configuration.

In the pizza industry, pizzas are cooked in ovens and are then normally cut diametrically several times to cut the pizza into pie shaped sections prior to serving or boxing of the pizza. The pizzas are usually cut by a knife which has a curved edge and which is applied to the pizza and then rocked on the curved cutting edge to effect a diametrical cut. The worker who cuts the pizza grips the knife by a handle which allows him to carry out the rocking motion that is necessary to cut through the pizza along its diameter.

Conventional pizza knives of this type have a metal blade and a separate handle which is typically constructed of wood and screwed or bolted to the blade. This type of handle does not always provide a secure and comfortable grip, particularly if the fastener is loose. In addition, the need to attach the handle and blade together requires fasteners and thus complicates the knife and creates the need for assembly operations which increase the costs. Furthermore, the handle can collect food particles, especially at the junction between the handle and blade where a tight crevice is presented, and this can lead to unsanitary conditions.

The present invention is directed to a pizza knife which eliminates these problems by providing a handle which is formed integrally with the cutting blade and which is arranged in a manner to offer a secure grip and to allow thorough cleaning. In accordance with the invention, a blade constructed of stainless steel or another suitable food grade substance has a semi-elliptical shape and a sharp cutting edge extending along its curved portion. A handle is formed as an integral part of the blade and has a special configuration that is easily formed by simple bending operations and, at the same time, offers functional advantages both in the handling of the knife and in facilitating cleanliness.

The handle has two opposite sides, one of which is bent from the blade along its straight edge. A top portion of the handle connects with both sides at rounded corners of the handle. The sides of the handle converge as they extend away from the top, and one side terminates in a free edge which is spaced away from the intersection between the other handle side and the blade. As a result of this construction, a channel is formed within the handle and is accessible through a gap presented between the two sides. There are no tight crevices on the knife to collect food scraps or foreign matter that could create sanitary problems. All surfaces can be easily and thoroughly cleaned by conventional methods. At the same time, the free edge on one side of the handle provides a convenient finger grip while the other side of the handle is located to receive the thumbs and palm areas of the hands in a comfortable manner.

DESCRIPTION OF THE DRAWING

In the accompanying drawings which form a part of the specification and are to be read in conjunction therewith and in which like reference numerals are used to indicate like parts in the various views:

FIG. 1 is perspective view of a pizza knife constructed according to a preferred embodiment of the present invention;

FIG. 2 is a front elevational view of the pizza knife on an enlarged scale;

FIG. 3 is end elevational view of the pizza knife; and

FIG. 4 is a sectional view on an enlarged scale taken through the pizza knife taken generally along line 4—4 of FIG. 2 in the direction of the arrows.

DETAILED DESCRIPTION OF THE INVENTION

Referring now to the drawings in more detail, numeral 10 generally designates a pizza knife which includes a blade 12 and a handle 14 that is formed integrally with the blade in accordance with the present invention. The blade 12 and the integral handle 14 are formed as a single piece, preferably from a suitable food grade material such as 18 gauge stainless steel. The blade 12 is flat and has a semi-elliptical configuration. Although the dimensions can vary, the blade should be long enough to cut the largest conventionally sized pizza. It has been found that good results are obtained with a semi-elliptical blade having a major ellipse axis of 20.375 inches and a minor ellipse axis of 8.0 inches.

A cutting edge 16 is provided on the curved edge portion of the blade 12. The edge 16 is sharpened to provide a knife edge which extends along substantially the entirety of the curved portion of the blade 12. However, on opposite ends 18 of the blade 12, it is preferred that the blade edge not be sharpened in order to avoid possible inadvertent cutting of the hands when the pizza knife is used.

The handle 14 extends in a straight line along the major axis of the ellipse between the opposite ends 18 of the blade 12. As best shown in FIG. 4, the handle includes opposite sides 20 and 22 and a top 24 which extends between the two sides 20 and 22. Side 20 is integral with the blade 12 and intersects with the blade at a bend 26 which is coincident with the major ellipse axis. Side 20 is generally flat and connects with one edge of the top 24 at a rounded corner 28 which is formed by a smooth bend that connects side 20 with the top 24.

The top 24 is generally flat and lies in a plane which is oriented perpendicular to the plane occupied by the blade 12. The top 24 and side 20 are oriented at an acute angle of about 60° relative to one another.

The second side 22 connects with the top 24 at a bend formed by a rounded corner 30. Side 22 is generally flat and is oriented at approximately 60° relative to the top 24. The edge of side 22 opposite its connection with the top 24 is a free edge 32 having its corners rounded or otherwise treated to remove all sharp edges. The free edge 32 is spaced away from the blade 12 and the bend 26 to present a gap 34 which extends along the length of the handle 14 and which may have a width of approximately ⅛ inch.

The two sides 20 and 22 converge as the extend away from the top 24 and toward the gap 34. This provides the handle 14 with a generally triangular shape in section and creates a channel 36 between the sides 20 and 22 and the top 24. The gap 34 provides access to the channel 36 along the entire length of the handle 14.

In use, a worker may conveniently grip the handle 14 of the pizza knife 10. Preferably, both hands are wrapped around the handle, with the fingertips gripping against edge 32 and the thumb and palm area applied to the surface of side 20. Alternatively, the fingertips may be applied to the outside of bend 26 with the thumbs engaged against the free edge 32. In either case, a comfortable and secure grip is provided and the knife 10 may be easily and safely handled.

The blade 12 is applied to the pizza and the cutting edge 16 is rolled or rocked along the diameter of the pizza to form a diametrical cut. Additional diametrical cuts can be made in the same manner to cut the pizza into pie shaped pieces.

The handle 14 is shaped in a manner to avoid presenting any sharp corners or other sharp edges other than on the cutting edge 16. Consequently, the knife may be used safely. In addition, there are no tight crevices provided anywhere on the knife that could collect food scraps or foreign material. Because the channel 36 is open at the bottom through the gap 34, the channel is easily cleaned and any materials that enter it are easily dislodged and removed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A pizza knife comprising:
   a substantially flat blade having opposite ends and a cutting edge curving between said opposite ends, said cutting edge being sharpened to cut pizza; and
   a handle integral with said blade and extending between said opposite ends, said handle having plural bends therein to present it with a size and shape to be gripped in the hands of a user while the cutting edge is applied to cut pizza, said handle including a first side integral with said blade and extending therefrom;
   a top integral with said first side and extending therefrom, said top being substantially planar and lying in a plane oriented generally perpendicular to the plane of the blade; and
   a second side integral with said top and extending therefrom.

2. The pizza knife of claim 1, wherein said blade has a semi-elliptical configuration.

3. The pizza knife of claim 1, wherein said top intersects with said first and second sides at rounded corners of the handle.

4. The pizza knife of claim 1, wherein said second side of the handle terminates in a free edge spaced away from the blade by a preselected gap.

5. The pizza knife of claim 4, wherein said first side of the handle intersects with the handle at a bend.

6. The pizza knife of claim 5, wherein said gap is located between said bend and the free edge of said second side.

7. The pizza knife of claim 6, wherein said first and second sides of the handle are oriented to converge as they extend away from said top and toward said gap.

8. The pizza knife of claim 7, wherein said top intersects with said first and second sides at rounded corners of the handle.

9. The pizza knife of claim 8, wherein said blade has a semi-elliptical configuration.

10. A pizza knife comprising:
    a flat metal blade having a semi-elliptical configuration and opposite ends, said blade presenting a curved cutting edge thereon which is sharpened to cut pizza;
    a rigid handle integral with said blade and extending in a generally straight line between said opposite ends of the blade, said handle including opposite sides and a top which bridges said sides and is connected therewith by respective bends in the handle, said top being substantially planar and lying in a plane oriented generally perpendicular to the plane of said blade; and
    each of said bends in the handle presenting a rounded corner thereon, one of said sides of the handle extending from said blade and having an integral connection therewith and the other of said sides terminating in a free edge spaced away from said integral connection by a preselected gap.

11. The pizza knife of claim 10, wherein said opposite sides of the handle are oriented to converge as they extend away from said top and toward said gap.

12. A pizza knife comprising:
    a flat blade having opposite ends and a sharp cutting edge curving between said opposite ends, said blade including an integral handle extending between said opposite ends to provide a hand grip for a user to apply said cutting edge to pizza;
    a first side of said handle integral with said blade and extending therefrom at a first bend;
    a top of said handle integral with said first side and extending therefrom at a second bend, said top being substantially planar and lying in a plane oriented generally perpendicular to the blade; and
    a second side of said handle integral with said top and extending therefrom at a third bend, said second side being spaced away from said first side and terminating in a free edge spaced away from said first bend by a preselected gap which provides access therethrough to a channel presented in the handle between said sides and top thereof.

13. The pizza knife of claim 12, wherein said second and third bends present rounded corners on said 14. The pizza knife of claim 12, wherein said blade has a semi-elliptical shape.

15. The pizza knife of claim 12, wherein said first and second sides of the handle are oriented to converge as they extend away from said top and toward said gap.

* * * * *